United States Patent
Sonkin et al.

(10) Patent No.: US 7,496,761 B2
(45) Date of Patent: Feb. 24, 2009

(54) METHOD AND SYSTEM FOR BATCH TASK CREATION AND EXECUTION

(75) Inventors: Dmitry Sonkin, Redmond, WA (US);
Bruce A. Prang, Woodinville, WA (US);
Robert Walters, Sammamish, WA (US);
Daniel Dines, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 888 days.

(21) Appl. No.: 10/953,734

(22) Filed: Sep. 29, 2004

(65) Prior Publication Data
US 2006/0075253 A1   Apr. 6, 2006

(51) Int. Cl.
    *H04L 9/32* (2006.01)
(52) U.S. Cl. .......................................... 713/182; 705/8
(58) Field of Classification Search .................. 713/202
    See application file for complete search history.

(56) References Cited

U.S. PATENT DOCUMENTS

| | | | | |
|---|---|---|---|---|
| 6,055,637 | A * | 4/2000 | Hudson et al. | 726/20 |
| 6,606,663 | B1 * | 8/2003 | Liao et al. | 709/229 |
| 6,668,322 | B1 * | 12/2003 | Wood et al. | 713/182 |
| 6,996,841 | B2 * | 2/2006 | Kadyk et al. | 726/12 |
| 7,010,600 | B1 * | 3/2006 | Prasad et al. | 709/225 |
| 2004/0002903 | A1 * | 1/2004 | Stolfo et al. | 705/26 |
| 2005/0004822 | A1 * | 1/2005 | Elgrably | 705/7 |

OTHER PUBLICATIONS

Biskup J. et al., "towards a Credential-Based Implementation of Compound Access Control Policies", *Symposium on Access Control Models and Technologies, Proceedings of the 9th ACM Symposium on Access Control Models and Technologies*, 2004, 31-40.

Holt, J.E. et al., "Hidden Credentials", *Workshop on Privacy in the Electronic Society, Proceeding of the ACM Workshop on Privacy in the Electronic Society*, 2003, 1-8.

* cited by examiner

*Primary Examiner*—Kambiz Zand
*Assistant Examiner*—Dant B Shaifer Harriman
(74) *Attorney, Agent, or Firm*—Woodcock Wasburn LLP

(57) ABSTRACT

A method of granting permission to use computer software resources when the user may be offline is accomplished through the use of proxy accounts. Each proxy account encapsulates a single set of user credentials. A set of user credentials contains at least a user name and a secret identifier, such as a password. These credentials are used by a scheduler function as an agent for the user to utilize computer resources to run jobs or tasks on behalf of the user. An embodiment of the invention allows for many different proxy account objects each having one set of credentials. The credentials are used at runtime to impersonate the user and allow a job to run. The job may involve multiple software subsystems. The architecture allows multiple proxy accounts to be created which allows system administrators flexibility in assigning different permissions to different users across multiple software environments.

26 Claims, 4 Drawing Sheets

METHOD AND SYSTEM FOR BATCH TASK CREATION AND EXECUTION

FIELD OF THE INVENTION

This invention relates in general to the field of software task execution. More particularly, this invention relates to scheduling and running tasks in a multiple proxy account environment.

BACKGROUND OF THE INVENTION

Many systems require the running of certain tasks in batch mode on schedule under certain account authorizations. An example would include executing certain maintenance tasks based upon either time schedule or in response to monitored system changing conditions. Generally, batch mode operations involve having a user generate a set of job steps that represent an overall task, and executing it at a specific time. In current systems, a system user may generate a batch mode task and may be permitted access to system resources for execution through the use a single proxy account. The proxy account gives the user authorized access to the computer resources which include software subsystems. However, all of the users with permission to generate batch mode jobs have equal access to the computer system via one proxy account. Many systems do not allow the system administrator to restrict user access to some subsystems and not others. The one proxy account that is provided on many computer systems gives all users the same ability to run batch mode tasks when the user is not online.

In addition, batch mode tasks cannot generally be run from one scheduler function across multiple platforms. For example, if a task has both a SQL Server type task and a Windows type task, the differing operating systems of the two environments requires that two separate user accounts be accessed and not just one. Consequently, a batch task that has one step including a SQL type instruction and a second step having a Windows-type instruction may be unable to fully execute without two separate user logins.

Thus, there is a need for a technique which would allow the operational advantage of having multiple proxy accounts that can operate across multiple computer software subsystems allowing multiple users to perform tasks. Additionally, it would be beneficial if a system administrator could restrict access to subsystem resources on a user by user basis. The present invention addresses the aforementioned needs and solves them with additional advantages as expressed herein.

SUMMARY OF THE INVENTION

An embodiment of the invention includes a method for authorizing access to computer resources using a proxy account and a credential from an authorized user of a computer software subsystem. The credential may be used for execution even when an authorized user is absent. The method includes the capability to allow a system administrator to restrict access to computer software resources in a manner that allows individual users to have access to only specific software subsystems. A system administrator can set up the authorization system by creating a credential referenced in a proxy account, wherein the credentials include an authorized user name and a password, by creating a mapping between the proxy account and at least one computer subsystem and by creating an association between a user submitting a task and the proxy account. This setup has the effect of authorizing access to a computer software subsystem under the condition that the user submitting the task is associated with the proxy account having the credential authorizing the submitted task. The submitted task can then be executed as a scheduled event by using the credential or a token representing the credential to impersonate the authorized user. The user submitting the task and the authorized user of the credential need not be the same entity.

In one embodiment, a method of using a proxy account to execute a batch task in a computer system wherein multiple users are associated with multiple proxy accounts, multiple proxy accounts are associated with multiple software subsystems and wherein any one proxy account has one credential, includes multiple steps. A first step is the scheduling of a batch task to be performed against the computer subsystem. Next, a verification that the batch task is authorized is performed by checking the association between a first user and the proxy account. The proxy account having access to a credential comprising an authorized second user name and associated password. The credential performs a mapping to at least one computer software subsystem that the second user has permissions to use. The third step includes executing the batch task at a scheduled time by accessing the proxy account and impersonating the authorized second user using the credential regardless of whether the first user and second user are logged onto the computer system.

BRIEF DESCRIPTION OF THE DRAWINGS

The foregoing summary, as well as the following detailed description of exemplary embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

In an embodiment of the invention, the granting of permissions to use computer resources by a user when the user may be offline is accomplished through the use of proxy accounts. Each proxy account encapsulates a single set of user credentials. A set of user credentials contains at least a user name and a secret identifier, such as a password. These credentials are used by a scheduler function as an agent for the user to utilize computer resources to run jobs or tasks on behalf of the user. An embodiment of the invention allows for many different proxy account objects each having one set of credentials.

Once a proxy account object is created, it can be assigned to computer system users for running their batch tasks. Many different proxy accounts can be associated with many different users. Users can task differing software subsystems into action on their behalf using the proxy account and its association with authorizing credentials. In addition, many different proxy accounts can be associated with many different subsystems. In this embodiment, system administrators can have a much finer granularity of control for granting permission to users that create tasks and allowing tasks to run under selected credentials. In one embodiment, the system administrator has access to all proxy accounts and all subsystems and is able to delineate which tasks can be run by a user and under a specific set of credentials.

Exemplary Embodiments of the Invention

Figure 1:
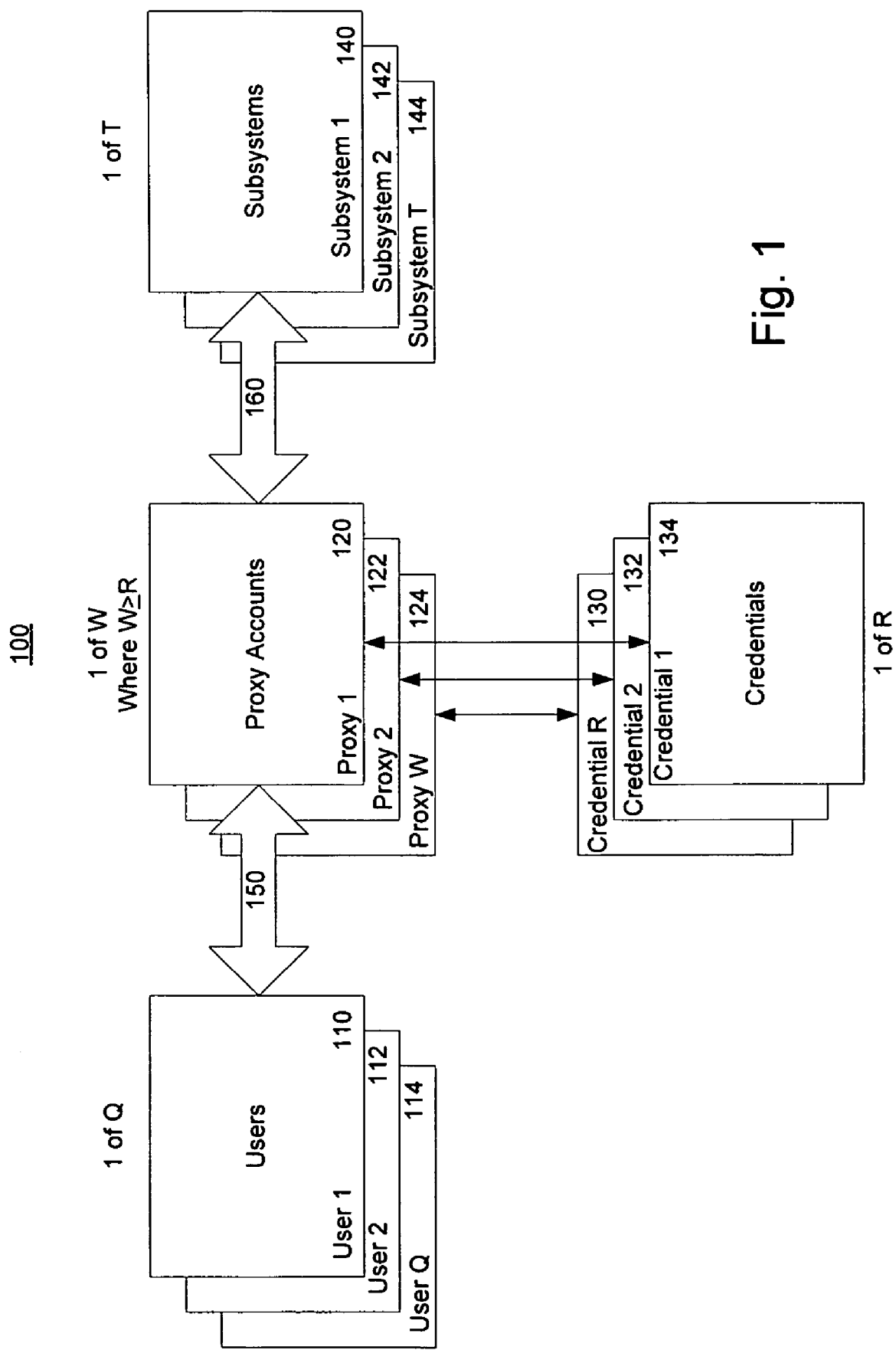
FIG. 1 is a diagram of an exemplary arrangement of functions according to the invention.

FIG. 1 is a depiction of a functional block diagram of an exemplary system for that implements proxy accounts for rendering system resource access privileges to a user. Overall, the software system involves users 110, 112, 114, proxy accounts 120, 122, 124 software subsystems 140, 142, 144 and credentials 130, 132, 134. The topology of the system 100 allows a multiple number of users 110, 112, 114 to have a multiple number of proxy accounts 120, 122, 124. A multiple number of proxy accounts 120, 122, 124 allow access to a multiple number of computer software subsystems 140, 142, 144 via use of authorizing credentials. Each proxy account is associated with one credential. However, there may be more than one proxy account that uses the same credential. For example, although the system shown in FIG. 1 has Q number of users, W number of proxy accounts and T number of subsystems, the number of credentials is only R. The number of proxy accounts W may exceed the number of credentials R where R can be less than or equal to W. A multiplicity of pathways 150 exists between the Q users and the W proxy accounts. Also, a multiplicity of pathways 160 exists between the W proxy accounts and the T subsystems. The numbers Q, W, R, and T can vary between a quantity of 1 and any whole number within the constraints of a host system embodying the topology of FIG. 1.

In the current invention, a proxy account is an entity, such as an object, that encapsulates the credential of an authorized system user. An authorized system user is defined as an entity, such as a person, that has authority to exercise specific computer resources, such as a computer software subsystem. A proxy account is independent of tasks and job steps created by a user.

A credential is an object that securely stores a data pair involving an identity, such as an authorized user name and an identity confirmation or secret, such as a password. In one embodiment, a proxy account may be viewed as a wrapper around a credential. Consequently, there is one credential per proxy account.

A task is one or more job steps associated with a software function in a computer such as execution of a command under some programming language. Tasks require the use of software subsystems. A subsystem is a software function, set of routines, or a distinct environment in which a task is to be performed. Examples of software subsystems include, but are not limited to, T-SQL commands, command executive functions, replication tasks, a data transformation task or service, an e-mail tool, a software language on a system, active scripting, a shell command execution, an analysis services query or other software program, utility, or function. A task, such as a batch task, may include multiple job steps, where the job step may invoke a software subsystem different from previous steps. Each job step of a task can be associated with a proxy account and the job step may be executed in the impersonated context of the proxy account having credentials allowing access to the subsystem.

Returning to FIG. 1, a user, such as user 2, 112 can log onto the system 100 and create a task, such as a scheduled task, and then log off expecting the system 100 to execute her task at the scheduled time. When the scheduled time arrives, the user authentication is performed to verify that the user has permissions to run the task. Assuming she does have permissions, the correct subsystem is accessed, and then the step may be executed without the user being available on the system.

Figure 2:
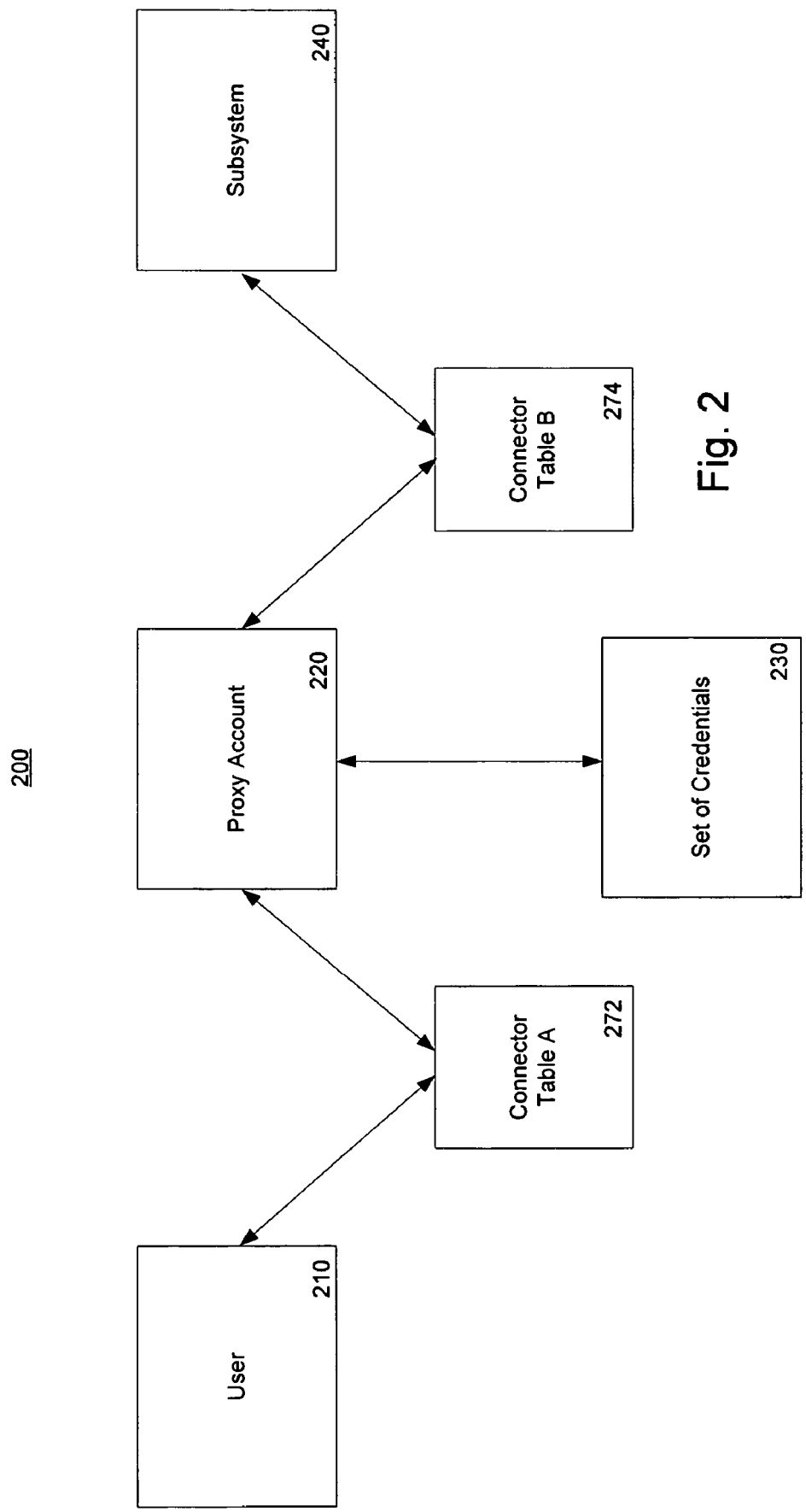
FIG. 2 is a block diagram involving further aspects of the invention.

FIG. 2 is a simplified block diagram depicting aspects of an embodiment of the invention. In the FIG. 2 embodiment, a responsible party, such as a system administrator, can set up the multiple proxy account system 200 allowing a user to execute tasks on one or more subsystems. In principle, any user that has login permissions to create jobs that use software subsystems may have a proxy account created for her.

The system of FIG. 2 may be set up by creating a credential 230 and associating the credential 230 with a proxy account 220. The credential typically identifies an individual or other entity that has permissions to use selected software subsystems. Thus there is a one to one mapping between a single proxy account 220 and a set of credentials 230. In one embodiment, the proxy account is an object that wraps around a set of credentials. Although a proxy account can only be associated with a single set of credentials, multiple proxy accounts can be associated to a single set of credentials. One advantage of using this approach is ease of maintenance of a set of credentials. For example, updating the password in a set of credentials can occur in one place and that update will automatically affect all appropriate proxy accounts.

In another setup step, an association may be made between a proxy account 220 and a subsystem 240. In one embodiment this association is made with a connector table 274. The connector table maps the specific proxy account to a specific subsystem. Table B 274 may have many entries mapping multiple proxy accounts with multiple subsystems. In another setup step, an association between a user and a proxy account is established. This may also be performed via the use of a connector table 272. Here, connector table A 272 identifies a user with a specific proxy account so that a user may leverage off the credential for the authorized subsystem user specified in the credential associated with the proxy account. Typically, a system administrator may set up the credential 230 and the connector tables A 272 and B 274.

Figure 3:
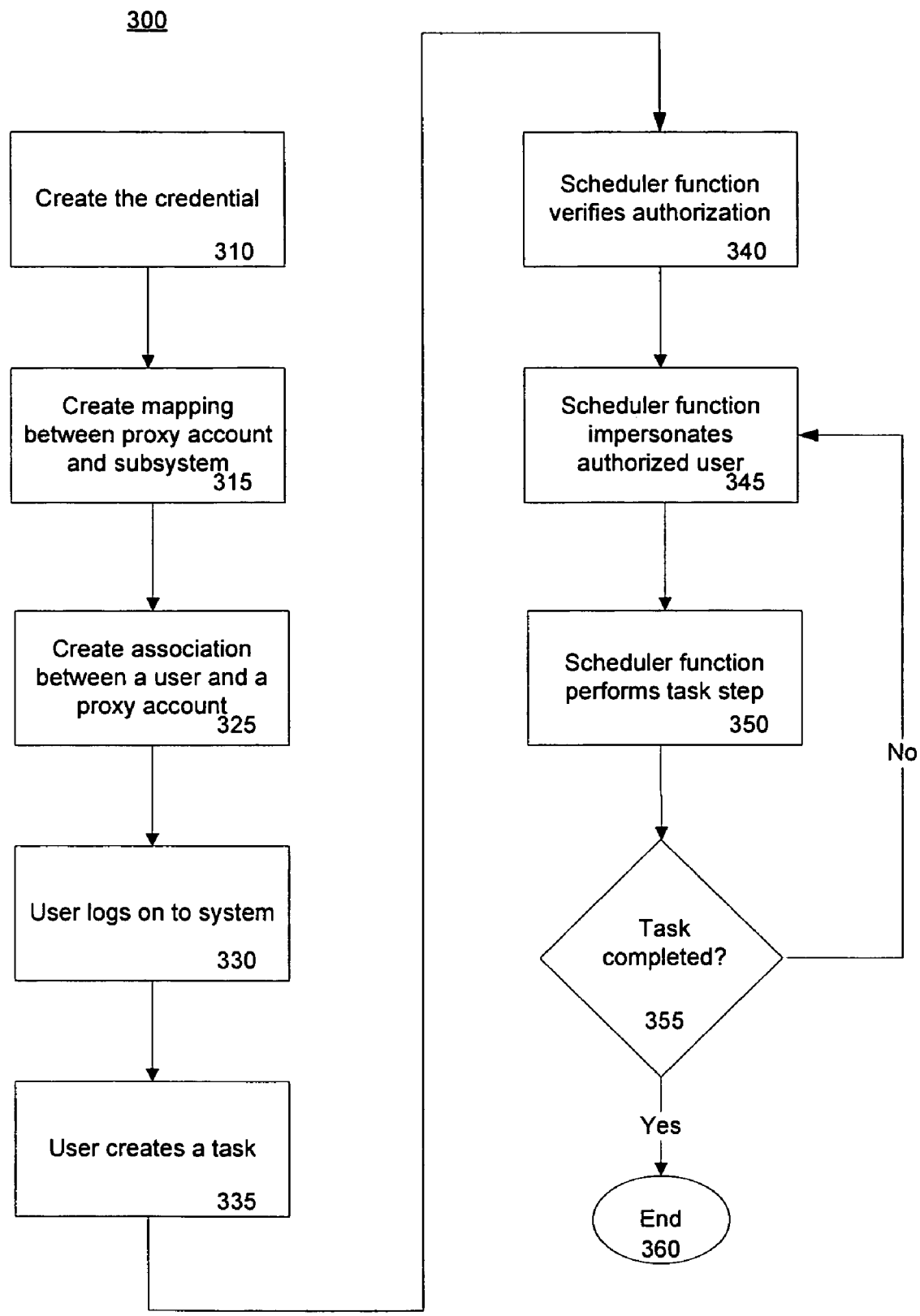
FIG. 3 is a flow diagram of an embodiment of the method of the invention.

FIG. 3 represents an exemplary method 300 for setting up and using aspects of the invention for using multiple proxies to authorize the performance of tasks from multiple users. Initially, a system administrator would set up a credential (step 310). As previously described, a credential may be a user name and secret confirmation, such as a password, wrapped in a proxy account to specify access to a software subsystem in a computer. Next, as part of the setup for operation, the system administrator creates a mapping between a proxy account and the subsystem (step 315). Note that more than one subsystem may be mapped to a single proxy account. This mapping identifies the credentials with a specific subsystem such that the holder of the credentials has authorization to utilize the specific software subsystem resources.

Next, an association is created between a user and a proxy account (step 325). The system administrator is able to limit access to subsystem resources by selectively allowing certain users to have proxy accounts. It is assumed that the selected users have a requirement to use the subsystem resources such as running tasks containing steps which use the subsystem resources. It should be noted that steps 310, 315 and 325 may be accomplished in any order and that a system administrator may alter one or more of these items out of order to expand or contract permissions extended to users of subsystem resources.

Use of the multiple proxy account system begins when a user logs into the system (step 330). Only users selected by the system administrator to have access to proxy accounts may properly use the restricted subsystem resources. Next, the logged in user creates a task requiring subsystem resources for execution (step 335). The task generally includes multiple steps. The steps can use one or more subsystems. For example, a task generated on a SQL Server environment using SQL Agent available through Microsoft® of Redmond Wash., may use both Active X and T-SQL steps in the task. These example steps use two different software subsystems; Active X and T-SQL. SQL Agent serves as the scheduler for the task. Two proxy accounts may be used; one for each subsystem being used by the task steps. So, the single user who generated the task would likely have associations to two proxy accounts; each proxy account having one set of credentials each; one for the Active X subsystem and one for the T-SQL subsystem.

Returning to FIG. 3, after the task is created by the user, a system scheduler function, such as SQL Agent, verifies the authorization of the user and proxy (step 340). In one embodiment, the scheduler accesses the connection table wherein an association was made between the user and the proxy account and verifies the association is valid. Assuming the task is a scheduled task, the scheduler may then await the scheduled time and execute the task.

The execution of the task involves the scheduler impersonating an authorized user of the system (step 345). The scheduler function performs this step by accessing the proxy indicated in step 340 associated with the user. The proxy accesses the related credential and has access to the authorized user name and password related to the entity that has permissions to use the subsystem indicated in the first step of the task. Once the authorized entity is identified, the scheduler impersonates (acts as) that entity to perform the task using the subsystem indicated in the task step (step 350).

The scheduler then moves to the next step in the task and determines if the user task is complete (step 355). If the user task is not complete and if the subsystem required is different, the process accesses the next subsystem by impersonating the next authorized user (step 345) in a credential corresponding to the next proxy to which the user is affiliated. If the subsystem used is the same as in the previous step, then no additional impersonation is needed. This process continues until all of the steps of the users task are completed. If the user task is complete, the process stops (step 360).

In one embodiment of the invention, A SQL Server environment is used with the addition of SQL Agent. This environment may optionally include a Windows computer system environment as well. In this environment, SQL Agent serves as the scheduler for the batch tasks that a user wishes to execute. SQL Agent has the responsibility to read the proxy account credentials when a task is to be performed. According to an aspect of the invention, SQL Agent impersonates the credential of an authorized entity to exercise the subsystem being requested as part of a step in the batch task. In one embodiment, an impersonation token is generated. Subsystems receive the impersonation token when called by SQL Agent in performing the various steps of the batch task. The existence of an impersonation token indicates that a proxy has been specified for the current task step and the subsystem should perform impersonation.

If the token is NULL the step is executed under SQL Agent credentials. The SQL Agent engine will decide if a non system administration job step should be executed using a proxy account or not executed at all. The job step may be not executed, for example, if the job owner is not a systems administrator and no proxy has been specified. For logging purposes, subsystems receive the login name of the proxy account entity indicated by the credential being used. The associated credential password is retrieved from a security protected safe store by the SQL Agent. The password is preferentially encrypted. After the creation of an impersonation token, the password is cleared in memory.

It is preferred that SQL Server requires SQL Agent to connect using integrated security to be able to encrypt the password with the delegation token acquired thru the integrated connection. SQL Agent will decrypt the password while it is protected from tempering by anyone intercepting the communication channel between SQL Agent and SQL Server. SQL Agent will check before executing each step if the job owner has permissions to use the proxy account and the corresponding credential to execute the particular step in the batch task that is being performed.

By using the proxy account and the corresponding credentials, it is possible to have multiple users gain access to multiple software subsystems of a computer system environment where the permissions are controlled and restricted by the system administrator via the creation of multiple proxy accounts. This can allow the execution of tasks that can cross multiple different subsystems such as a combined SQL Server and Windows environment. The specific task generation users nor the credential authorized users need be online because the credentials can be impersonated by the SQL agent scheduler function.

Exemplary Computing Device

Figure 4:
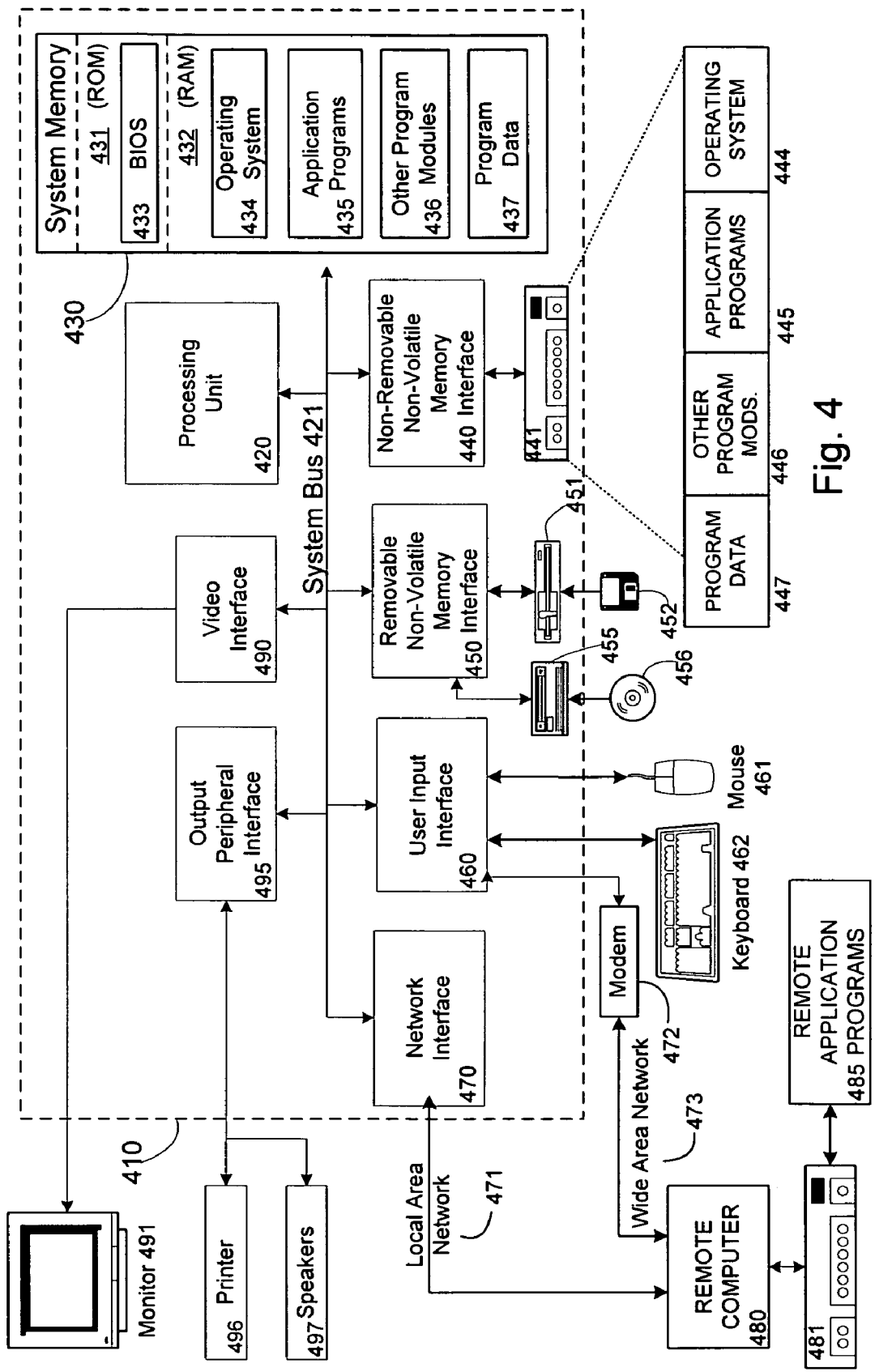
FIG. 4 is a block diagram showing an exemplary computing environment in which aspects of the invention may be implemented.

FIG. 4 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 4 thus illustrates an example of a suitable computing system environment 400 in which the embodiments of the invention may be implemented, although as made clear above, the computing system environment 400 is only one example of a suitable computing environment and is not intended to suggest any limitation as to the scope of use or functionality of an embodiment of the invention. Neither should the computing environment 400 be interpreted as having any dependency or requirement relating to any one or combination of components illustrated in the exemplary operating environment 400.

With reference to FIG. 4, an exemplary system for implementing an embodiment of the invention includes a general purpose computing device in the form of a computer system 410. Components of computer system 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 410 typically includes a variety of computer readable media. Computer readable media can be any available media that can be accessed by a computer system 410 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to Random Access Memory (RAM), Read Only Memory (ROM), Electrically Erasable Programmable Read Only Memory (EEPROM), flash memory or other memory technology, Compact Disk Read Only Memory(CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can be accessed by computer system 410. Communication media typically embodies computer readable instructions, data structures and program modules. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer system 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer system 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer system 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer system 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490, which may in turn communicate with video memory (not shown). In addition to monitor 491, computer systems may also include other peripheral output devices such as speakers 497 and printer 496, which may be connected through an output peripheral interface 495.

The computer system 410 may operate in a networked or distributed environment using logical connections to one or more remote computers, such as a remote computer 480. The remote computer 480 may be a personal computer, a server, a router, a network PC, a peer device or other common network node, and typically includes many or all of the elements described above relative to the computer system 410, although only a memory storage device 481 has been illustrated in FIG. 4. The logical connections depicted in FIG. 4 include a local area network (LAN) 471 and a wide area network (WAN) 473, but may also include other networks/ buses. Such networking environments are commonplace in homes, offices, enterprise-wide computer networks, intranets and the Internet.

When used in a LAN networking environment, the computer system 410 is connected to the LAN 471 through a network interface or adapter 470. When used in a WAN networking environment, the computer system 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer system 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a software program profiler for an embedded system. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method of executing a task in batch mode, the task comprising a plurality of job steps, the method comprising:
creating at least one proxy account, wherein each proxy account encapsulates a credential, wherein each credential comprises an authorized user name and a password corresponding to an authorized user, wherein the credential identifies the authorized user as having authority to exercise at least one respective computer software subsystem;
creating a mapping between each of the at least one proxy account and a corresponding computer subsystem, each computer subsystem comprising at least one member of a group comprising programs and services, and each computer subsystem being associated with a step of the task;
creating an association between a submitting user that submits the task and the at least one proxy account;
receiving the task from the submitting user;
scheduling the task;
causing an SQL agent to execute the task whereby the SQL agent for each step of the task:
determines a current proxy account associated with a current computer subsystem associated with the step; and
accesses the current computer subsystem by impersonating an authorized user corresponding to a credential encapsulated in the current proxy account using the encapsulated credential in the current proxy account.

2. The method of claim 1, wherein the steps of creating a mapping between each of the at least one proxy account and a corresponding computer subsystem, and creating an association between a submitting user that submits the task and the at least one proxy account are performed at the request of a system administrator.

3. The method of claim 1, wherein the steps of creating a mapping and creating an association are performed with the use of a connector table.

4. The method of claim 1, wherein the task is executed by a scheduler.

5. The method of claim 4, further comprising executing the submitted task as a scheduled event.

6. The method of claim 5, wherein the authorized user is different from the submitting user.

7. The method of claim 6, wherein a token is generated, which is provided to each current computer subsystem during execution of the task.

8. A method of executing a batch task in a computer system, the method comprising:
scheduling the batch task requested by a first user, wherein the batch task comprises a plurality of steps;
verifying that the batch task is authorized by checking an association between the first user and at least one proxy account, each of the at least one proxy account having access to a respective credential comprising an authorized second user name and associated password, the credential mapping to at least one computer software subsystem that a second user has permissions to use; and
executing the batch task at a scheduled time by accessing each of the at least one proxy account and impersonating the respective authorized second user using the credential regardless of whether the first user and second user are logged onto the computer software system that the second user has permissions to use, wherein multiple users are associated with multiple proxy accounts, multiple proxy accounts are associated with multiple computer software subsystems and wherein any one proxy account has access to one respective credential.

9. The method of claim 8, wherein checking the association between the first user and the proxy account comprises accessing a connector table.

10. The method of claim 8, wherein executing the batch task further comprises accessing a table that associates the proxy account with at least one subsystem of the computer.

11. The method of claim 10, wherein the at least one computer software subsystem comprises at least one member of a group comprising commands and programs of the computer system.

12. The method of claim 8, wherein executing the batch task at a scheduled time further comprises accessing the at least one proxy account and impersonating the respective authorized second user using a token that represents the credential.

13. A system for using a proxy account to execute job steps, the system comprising:
a processor, wherein the processor is adapted to:
provide a user interface to allow a first user to enter the job steps;
schedule the job steps to be performed with one or more computer software subsystems;
verify that a job step execution is authorized by checking an association between the first user and a proxy account; the proxy account referencing a credential comprising an authorized second user name and associated password, the credential mapping to at least one computer software subsystem that the second user has permissions to use; and
perform the job step at a scheduled time by accessing the proxy account and using the credential to impersonate the authorized second user regardless of whether the first user and second user are logged onto the computer software system that the second user has permissions to use.

14. The system of claim 13, wherein the step of performing the job step further comprises using a token to represent the credential to impersonate the authorized second user.

15. A computer-readable medium having computer-executable instructions for performing a method of authorizing access to computer resources, the method comprising:
creating at least one credential referenced in each of at least one respective proxy accounts, wherein the at least one credential comprises an authorized user name and a password;
creating a mapping between each of the at least one proxy accounts and at least one respective computer subsystem, the at least one computer subsystem comprising at least one member of a group comprising programs and services provided by the computer resources;
creating an association between a user submitting a task and the proxy account; and
authorizing access to the at least one computer subsystem under the condition that the user submitting the task is associated with the proxy account having the credential authorizing use of the at least one computer subsystem for the submitted task.

16. The computer-readable medium of claim 15, wherein the steps of creating at least one credential, creating a mapping between each of the at least one proxy account and at least one respective computer subsystem, and creating an association between a user submitting a task and the proxy account are performed at the request of a system administrator.

17. The computer-readable medium of claim 15, wherein the steps of creating a mapping and creating an association are performed with the use of a connector table.

18. The computer-readable medium of claim 15, wherein the step of authorizing access further comprises accessing credential information prior to running the task.

19. The computer-readable medium of claim 15, wherein the method further comprises executing the submitted task as a scheduled event by using the credential to impersonate the authorized user.

20. The computer-readable medium of claim 19, wherein the authorized user is different from the user submitting the task.

21. The computer-readable medium of claim 19, wherein the credential is replaced by a token and the token is used to impersonate the authorized user.

22. A computer-readable medium having computer-executable instructions for performing a batch task in a computer system, the method comprising:
scheduling the batch task requested by a first user, wherein the batch task comprises a plurality of steps;
verifying that the batch task is authorized by checking an association between the first user and at least one proxy account, each of the at least one proxy account having access to a respective credential comprising an authorized second user name and associated password, the credential mapping to at least one computer software subsystem that the second user has permissions to use; and
executing the batch task at a scheduled time by accessing each of the at least one proxy account and impersonating the authorized second user using the respective credential regardless of whether the first user and second user are logged onto the computer software system that the second user has permissions to use, wherein multiple users are associated with multiple proxy accounts, multiple proxy accounts are associated with multiple computer software subsystems and wherein any one proxy account access to one respective credential.

23. The computer-readable medium of claim 22, wherein the step of checking the association between the first user and the proxy account comprises accessing a connector table.

24. The computer-readable medium of claim 22, wherein the step of executing the batch task further comprises accessing a table that associates the at least one proxy account with at least one respective subsystem of the computer.

25. The computer-readable medium of claim 24, wherein the at least one computer software subsystem comprises at least one member of a group comprising commands and programs of the computer system.

26. The computer-readable medium of claim 22, wherein the step of executing the batch task at a scheduled time further comprises accessing the at least one proxy account and impersonating the authorized second user using a token that represents the respective credential.

* * * * *